United States Patent
Kim et al.

(10) Patent No.: US 10,397,831 B1
(45) Date of Patent: Aug. 27, 2019

(54) SYSTEMS AND METHODS FOR LOAD BALANCING BETWEEN FREQUENCY BANDS BASED ON BANDWIDTH CAPACITY

(71) Applicant: Sprint Spectrum LP, Overland Park, KS (US)

(72) Inventors: Yun Sung Kim, Ashburn, VA (US); Sanghoon Sung, Ashburn, VA (US); Pinal Tailor, Ashburn, VA (US); Dhaval Mehta, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 469 days.

(21) Appl. No.: 15/138,235

(22) Filed: Apr. 26, 2016

(51) Int. Cl.
  *H04W 28/08* (2009.01)
  *H04W 72/04* (2009.01)
  *H04L 5/14* (2006.01)

(52) U.S. Cl.
  CPC ............. *H04W 28/085* (2013.01); *H04L 5/14* (2013.01); *H04W 72/0486* (2013.01)

(58) Field of Classification Search
  CPC ............................ H04W 28/085; H04L 15/14
  USPC ........................................................ 370/235
  See application file for complete search history.

(56) References Cited

U.S. PATENT DOCUMENTS

| | | | |
|---|---|---|---|
| 8,718,704 B2 | 5/2014 | Khanka et al. | |
| 8,792,889 B2 | 7/2014 | Wang et al. | |
| 9,380,594 B1* | 6/2016 | Malmirchegini | H04W 72/10 |
| 2002/0085509 A1* | 7/2002 | Funayama | H04B 1/525 |
| | | | 370/276 |
| 2009/0323530 A1* | 12/2009 | Trigui | H04L 41/5025 |
| | | | 370/235 |
| 2010/0173592 A1* | 7/2010 | Yamazaki | H04B 7/0615 |
| | | | 455/69 |
| 2011/0261704 A1 | 10/2011 | Etemad | |
| 2013/0244640 A1* | 9/2013 | Viorel | H04W 56/0005 |
| | | | 455/422.1 |
| 2016/0044538 A1* | 2/2016 | Aksu | H04W 28/085 |
| | | | 370/235 |

* cited by examiner

*Primary Examiner* — Samina F Choudhry

(57) ABSTRACT

Systems and methods are described for load balancing between frequency bands based on bandwidth capacity. A load for a first frequency band and a load for a second frequency band may be determined, wherein a cell communicates with wireless devices over the first and second frequency bands. The determined loads may be adjusted based on a channel width for each frequency band and a duplexing scheme for each frequency band. And the adjusted loads may be balanced between the first frequency band and the second frequency band by instructing wireless devices in communication with the cell to change frequency bands used for communicating with the cell.

10 Claims, 11 Drawing Sheets

802 →

| 3 MHz FDD | | Adjusted Load | | |
|---|---|---|---|---|
| Usage | Weight: 1 | Weight: 1 | Weight: 2 | Weight: 3 |
| 90% | 95% | | 100% | 100% |
| 80% | 89% | | 98% | 100% |
| 70% | 82% | | 95% | 100% |
| 60% | 74% | | 90% | 100% |
| 50% | 65% | | 83% | 100% |
| 40% | 54% | | 74% | 100% |
| 30% | 43% | | 61% | 88% |
| 20% | 30% | | 45% | 68% |
| 10% | 16% | | 25% | 40% |

804 →

| 5 MHz FDD | | Adjusted Load | | |
|---|---|---|---|---|
| Usage | Weight: 1 | Weight: 1 | Weight: 2 | Weight: 3 |
| 90% | 90% | | 90% | 90% |
| 80% | 80% | | 80% | 80% |
| 70% | 70% | | 70% | 70% |
| 60% | 60% | | 60% | 60% |
| 50% | 50% | | 50% | 50% |
| 40% | 40% | | 40% | 40% |
| 30% | 30% | | 30% | 30% |
| 20% | 20% | | 20% | 20% |
| 10% | 10% | | 10% | 10% |

806 →

| 15 MHz FDD | | Adjusted Load | | |
|---|---|---|---|---|
| Usage | Weight: 1 | Weight: 1 | Weight: 2 | Weight: 3 |
| 90% | 81% | | 72% | 65% |
| 80% | 64% | | 52% | 41% |
| 70% | 50% | | 36% | 26% |
| 60% | 39% | | 25% | 16% |
| 50% | 29% | | 17% | 10% |
| 40% | 21% | | 11% | 6% |
| 30% | 14% | | 6% | 3% |
| 20% | 8% | | 3% | 1% |
| 10% | 4% | | 1% | 1% |

FIG. 8

SYSTEMS AND METHODS FOR LOAD BALANCING BETWEEN FREQUENCY BANDS BASED ON BANDWIDTH CAPACITY

TECHNICAL BACKGROUND

Telecommunication systems, such as cellular networks or other wireless networks, provide access points such that wireless devices may access the systems. For example, an access node may comprise an access point used by a wireless device to gain access to a communication network. In addition, the access point may leverage a plurality of frequency bands in order to provide wireless services to a number of wireless devices. However, in some circumstances, the load between frequency bands used to serve wireless devices may become unbalanced. Accordingly, it may be beneficial for a system to balance load between available frequency bands based on the available capacity for the frequency bands.

OVERVIEW

Systems and methods are described for load balancing between frequency bands based on bandwidth capacity. A load for a first frequency band and a load for a second frequency band may be determined, wherein a cell communicates with wireless devices over the first and second frequency bands. The determined loads may be adjusted based on a channel width for each frequency band and a duplexing scheme for each frequency band. And the adjusted loads may be balanced between the first frequency band and the second frequency band by instructing wireless devices in communication with the cell to change frequency bands used for communicating with the cell.

BRIEF DESCRIPTION OF THE DRAWINGS

FIG. 8 illustrates example adjusted loads for frequency bands according to some embodiments.

DETAILED DESCRIPTION

Systems and methods are described for load balancing between frequency bands based on bandwidth capacity. In some circumstances, conventional load balancing may be ineffective in utilizing the available bandwidth capacity of one or more frequency bands. For example, a cell may communicate with a plurality of wireless devices using a plurality of frequency bands. In some examples, the load between the plurality of frequency bands may become unbalanced. Conventional load balancing may balance load based on a percentage utilization for each of the frequency bands (e.g., percentage of physical resource block utilization). However, in some circumstances, percentage utilization may not accurately account for the available bandwidth of a frequency band. For instance, 20% of a first frequency band may be able to service more wireless devices (e.g., may comprise more available bandwidth for wireless services) than 20% of a second frequency band. Accordingly, determined loads for the frequency bands may be adjusted, for example based on a channel width for the frequency bands and a duplexing scheme for the frequency bands. The loads between the frequency bands may then be balanced based on the adjusted loads such that the load balancing algorithms utilize available bandwidth more efficiently.

Figure 1:
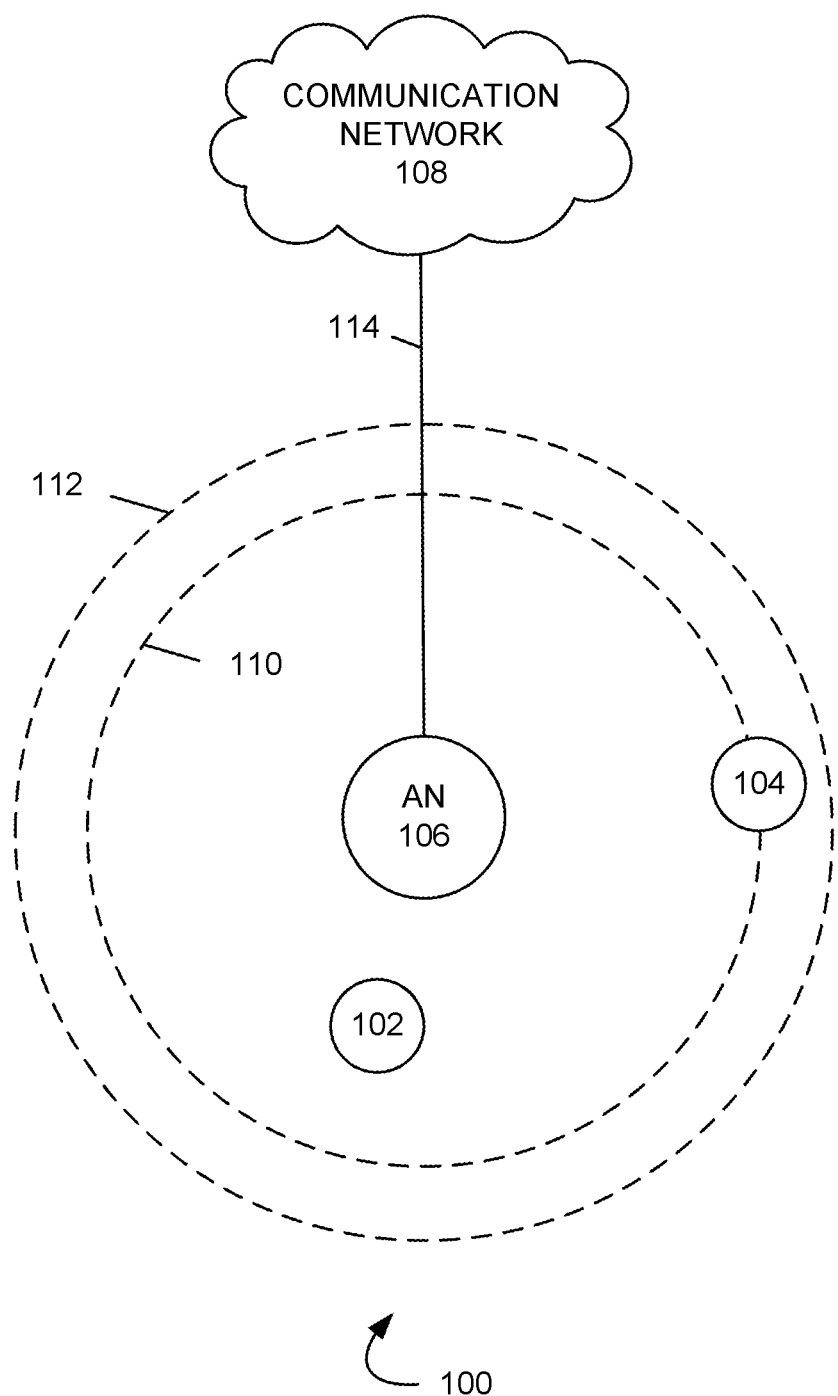
FIG. 1 illustrates an exemplary communication system to load balance between frequency bands based on bandwidth capacity.

FIG. 1 illustrates an exemplary communication system 100 to load balance between frequency bands based on bandwidth capacity comprising wireless devices 102 and 104, access node 106, communication network 108, coverage areas 110 and 112, and communication link 114. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 106 and communication network 108 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, relay communication device, or an internet access device, and combinations thereof. It is noted that while three wireless devices are illustrated in FIG. 1 as being in communication with the depicted access node and antenna system, any number of wireless devices can be implemented.

Access node 106 is a network node capable of providing wireless communication to wireless device 102, and can be, for example, a base transceiver station, a radio base station, an eNodeB device, a small cell (i.e. pico node, femto node, and the like), or any other suitable network element. Access node 106 may communicate with communication network 108 over communication link 112. Although only one access node is illustrated in FIG. 1, wireless device 102 (and other wireless device not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication link 114 can be a wired or wireless communication link. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 106 may establish communication with wireless devices 102 and 104 such that access node 106 provides the wireless devices access to a communication network (e.g., communication network 108). In an embodiment, system 100 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 106 may comprise coverage areas 110 and 112. For example, a coverage area may be the area around an access node or cell where a wireless device may detect wireless signals transmitted from the node or cell (e.g., detect signals at a signal level above a threshold) or where a wireless device may transmit wireless signals to the node or cell (e.g., transmit signals such that they are detected at the node or cell at a signal level above a threshold). In an embodiment, coverage area 110 may correspond to the coverage area of a first frequency band used by access node 106 to communicate with wireless devices and coverage area 112 may correspond to the coverage area of a second frequency band used by access node 106 to communicate with wireless devices.

In an embodiment, the load between the plurality of frequency bands used by access node 106 to communicate with wireless devices may become unbalanced. For instance, the first frequency band may become overloaded when compared to the second frequency band, or vis versa. Conventional load balancing may balance load based on a percentage utilization for each of the frequency bands (e.g., percentage of physical resource block utilization). However, in some circumstances, percentage utilization may not accurately account for the available bandwidth of a frequency band. Accordingly, it may be beneficial to balance loads between frequency bands based on an adjusted load such that the load balancing algorithms utilize available bandwidth more efficiently.

Figure 2:
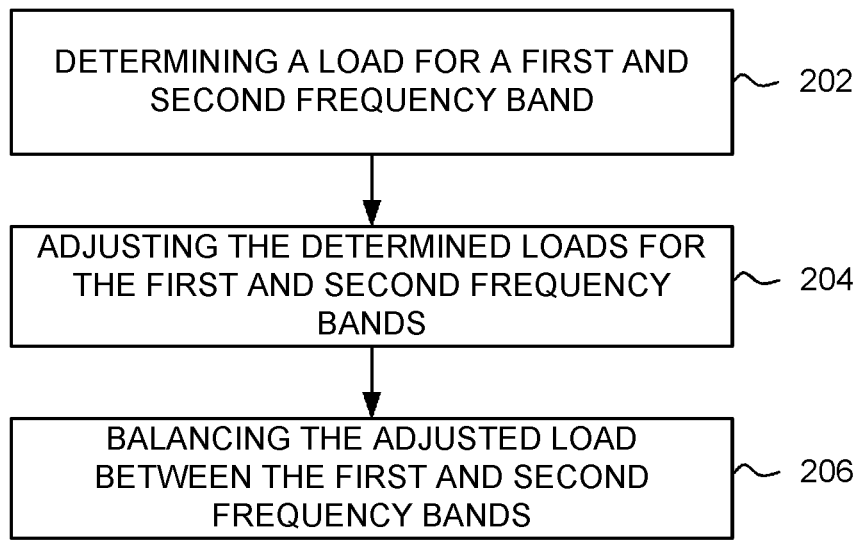
FIG. 2 illustrates an exemplary method for load balancing between frequency bands based on bandwidth capacity.

FIG. 2 illustrates an exemplary method for load balancing between frequency bands based on bandwidth capacity according to an embodiment. The method will be discussed with reference to the exemplary communication system 100 illustrated in FIG. 1, however, the method can be implemented with any suitable communication system.

Referring to FIG. 2, at step 202, a load for a first frequency band and a load for a second frequency band may be determined, wherein a cell communicates with wireless devices over the first and second frequency bands. For example, a cell of access node 106 may communicate with wireless devices (e.g., wireless devices 102 and 104) over a first and second frequency band. A load (e.g., utilization) for each frequency band may be determined.

At step 204, the determined loads may be adjusted based on a channel width for each frequency band and a duplexing scheme for each frequency band. For example, each of the first frequency band and the second frequency band may comprise a channel width (e.g., 3 Mhz, 5 Mhz, 10 Mhz, 15 Mhz, 20 Mhz, and the like) and a duplexing scheme (e.g., time division duplexing (TDD) or frequency division duplexing (FDD)). The determined loads for the first and second frequency bands may be adjusted based on the channel width for each of the frequency bands and whether the frequency bands communicate using TDD or FDD.

At step 206, the adjusted loads may be balanced between the first frequency band and the second frequency band by instructing wireless devices in communication with the cell to change frequency bands used for communicating with the cell. For example, based on the adjusted loads, one or more wireless devices in communication with access node 106 using the cell may be instructed to change the frequency band used for communication. In some embodiments, the resultant handovers of wireless devices may achieve load balancing.

Figure 3:
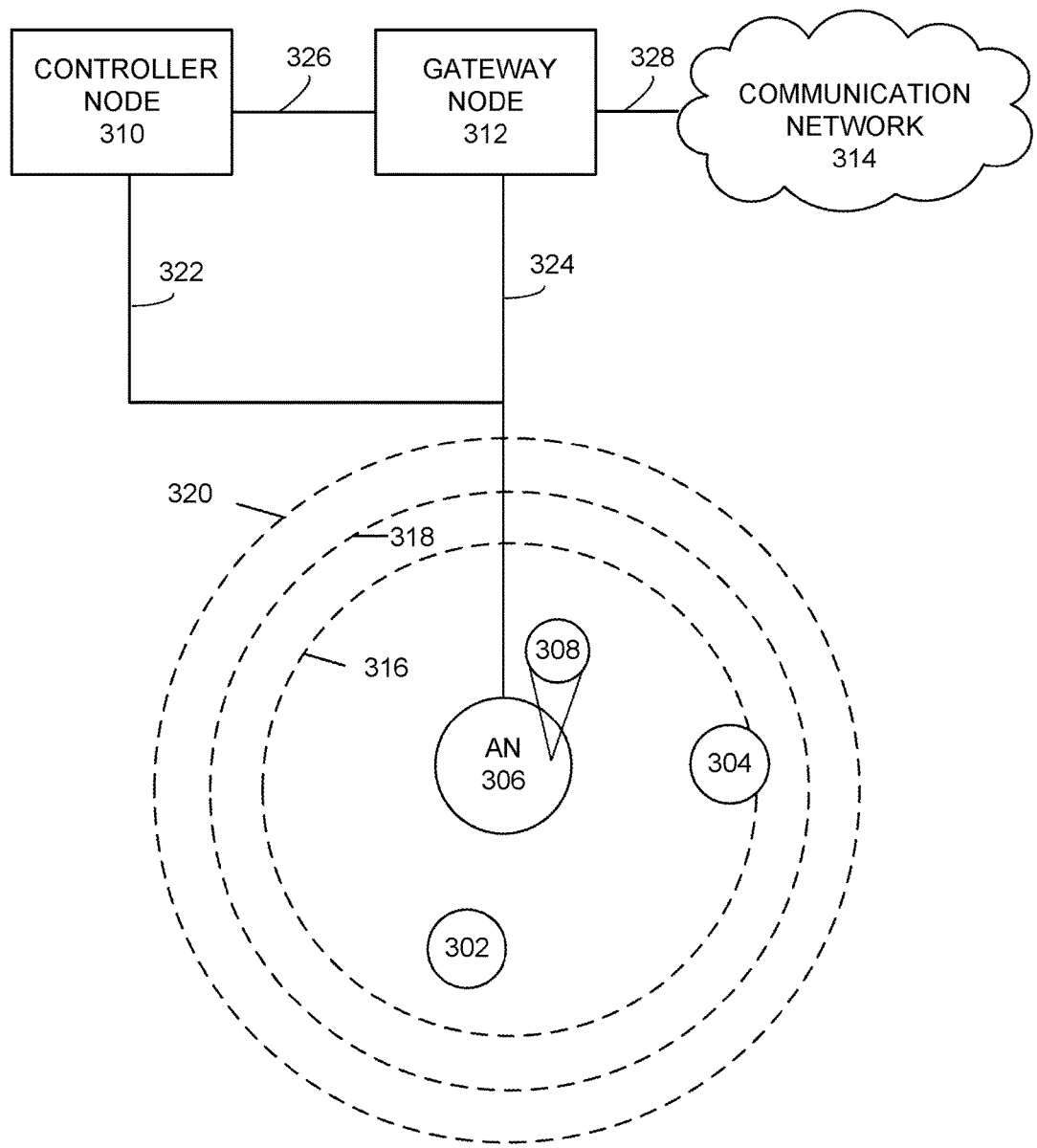
FIG. 3 illustrates another exemplary communication system to load balance between frequency bands based on bandwidth capacity.

FIG. 3 illustrates another exemplary communication system 300 to allocate resource blocks based on uplink transmission parameters according to an embodiment. Communication system 300 may comprise wireless devices 302 and 304, access node 306, load balancer 308, controller node 310, gateway node 312, communication network 314, coverage areas 316, 318, and 320 and communication links 322, 324, 326, and 328. Other network elements may be present in the communication system 300 to facilitate communication but are omitted for clarity, such as base stations, base station controllers, gateways, mobile switching centers, dispatch application processors, and location registers such as a home location register or visitor location register.

Wireless devices 302 and 304 can be any device configured to communicate over communication system 300 using a wireless communication link. For example, wireless devices 302 and 304 can include a cell phone, a smart phone, a computing platform such as a laptop, palmtop, or a tablet, a personal digital assistant, relay communication device, or an internet access device, and combinations thereof.

Access nodes 306 is a network node capable of providing wireless communication to wireless devices 302 and 304, and can be, for example, a base transceiver station, a radio base station, an eNodeB device, a small cell (i.e. pico node, femto node, and the like), or any other suitable network element. In an embodiment, access node 306 can comprise a serving access node for wireless device 302. Access node 306 may communicate with controller node 310 over communication link 322, and with gateway node 312 over communication links 324. Although only one access node is illustrated in FIG. 3, wireless devices 302 and 304 (and other wireless device not depicted) can be in communication with a plurality of access nodes and/or small cells. The plurality of access nodes and/or small cells can be associated with different networks and can support different communication protocols and radio access technologies.

Access node 306 may comprise load balancer 308 that balance loads between frequency bands available for communication at the access node. Load balancer 308 may comprise hardware and associated circuitry or software implementing computer code to perform load balancing functions. In some embodiments, load balancer 308 may be a standalone device, part of controller node 310, or part of any other suitable network element. Load balancer 308 may perform one or more of the methods of FIGS. 2, 4, and 7 to achieve load balancing at access node 306 or at a cell of access node 306.

Controller node 310 can be any network node configured to manage services within system 300. Controller node 310 may provide other control and management functions for system 300. The controller node 310 can be a single device having various functions or a plurality of devices having differing functions. For example, controller node 310 can include at least one of a multi-cell/multicast coordination entity (MCE), a mobility management entity (MME), a radio network controller (RNC), a mobile switching center (MSC), and a combination thereof.

Controller node 310 can comprise a processor and associated circuitry to execute or direct the execution of computer-readable instructions to obtain information. Controller node 310 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 310 can receive instructions and other input at a user interface. Controller node 310 can comprise a processor and associated circuitry to execute or direct the execution of computer-readable instructions to obtain information.

Gateway node 312 is a network element which can comprise a processor and associated circuitry to execute or direct the execution of computer-readable instructions. Gateway node 312 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 312 can provide instructions to access node 306 related to channel selection in communications with wireless devices. For example, gateway node 312 can comprise at least one of a serving gateway (SGW), a packet data network gateway (PDNGW), a cellular gateway (CGW), and a combination thereof.

Communication network 314 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 314 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 314 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 322, 324, 326, and 328 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 306, controller node 310, gateway node 312, and communication network 314 which are omitted for clarity, including additional processing nodes, routers, gateways, and physical and/or wireless data links for carrying data among the various network elements. In an embodiment, any of controller node 310, gateway node 312, and one or more modules of access node 306, may perform all or parts of the methods of FIGS. 2, 4, and 7.

In operation, access node 306 may establish communication with wireless devices 302 and 304 such that access node 306 provides the wireless devices access to a communication network (e.g., communication network 314). In an embodiment, system 400 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 306 may comprise coverage areas 316, 318 and 320. For example, a coverage area may be the area around an access node or cell where a wireless device may detect wireless signals transmitted from the node or cell (e.g., detect signals at a signal level above a threshold) or where a wireless device may transmit wireless signals to the node or cell (e.g., transmit signals such that they are detected at the node or cell at a signal level above a threshold). In an embodiment, coverage area 316 may correspond to the coverage area of a first frequency band used by access node 306 to communicate with wireless device, coverage area 318 may correspond to the coverage area of a second frequency band used by access node 306 to communicate with wireless devices, and coverage area 320 may correspond to the coverage area of a third frequency band used by access node 306 to communicate with wireless devices. The illustrated coverage areas are merely exemplary, and my take different shapes and comprise different sizes.

In an embodiment, the load between the plurality of frequency bands used by access node 306 to communicate with wireless devices may become unbalanced. For instance, the first frequency band may become overloaded when compared to the second frequency band or third frequency band. Conventional load balancing may balance load based on a percentage utilization for each of the frequency bands (e.g., percentage of physical resource block utilization). However, in some circumstances, percentage utilization may not accurately account for the available bandwidth of a frequency band. Accordingly, it may be beneficial to balance loads between frequency bands based on an adjusted load such that the load balancing algorithms utilize available bandwidth more efficiently.

Figure 4:
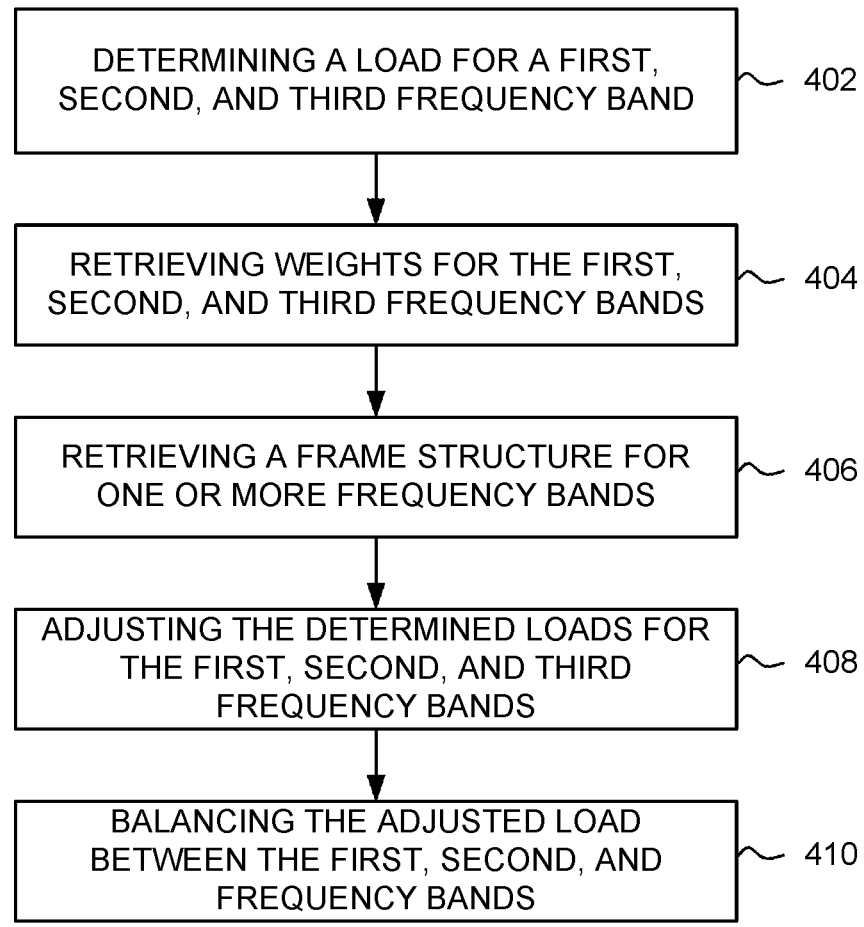
FIG. 4 illustrates another exemplary method for load balancing between frequency bands based on bandwidth capacity.

FIG. 4 illustrates an exemplary method for load balancing between frequency bands based on bandwidth capacity according to an embodiment. The method will be discussed with reference to the exemplary communication system 300 illustrated in FIG. 3, however, the method can be implemented with any suitable communication system.

Referring to FIG. 4, at step 402, a load for a first frequency band, a load for a second frequency band, and a load for a third frequency band may be determined, wherein a cell communicates with wireless devices over the first, second, and third frequency bands. For example, a cell of access node 306 may communicate with wireless devices (e.g., wireless devices 302 and 304) over a first, second, and third frequency band. A load (e.g., utilization) for each frequency band may be determined.

In some embodiments, the cell may comprise a sector, frequency bands (e.g., a subset of frequency bands available for communication), or any other suitable aspect of access node 306. For example, access node 306 may comprise a plurality of sectors divided by, for instance, by coverage area (e.g., three 120° sectors, or arcs), frequency bands used for communication (e.g., different bundles of frequency bands may comprise different cells), and the like.

In some embodiments, the determined utilization may comprise a utilization of physical resource blocks available for communication on the particular frequency band. For example, the utilization may comprise a percentage of physical resource blocks used for communication with wireless devices monitored over a period of time (e.g., 10%, 20%, 50%, 75%, and the like).

Figure 5:
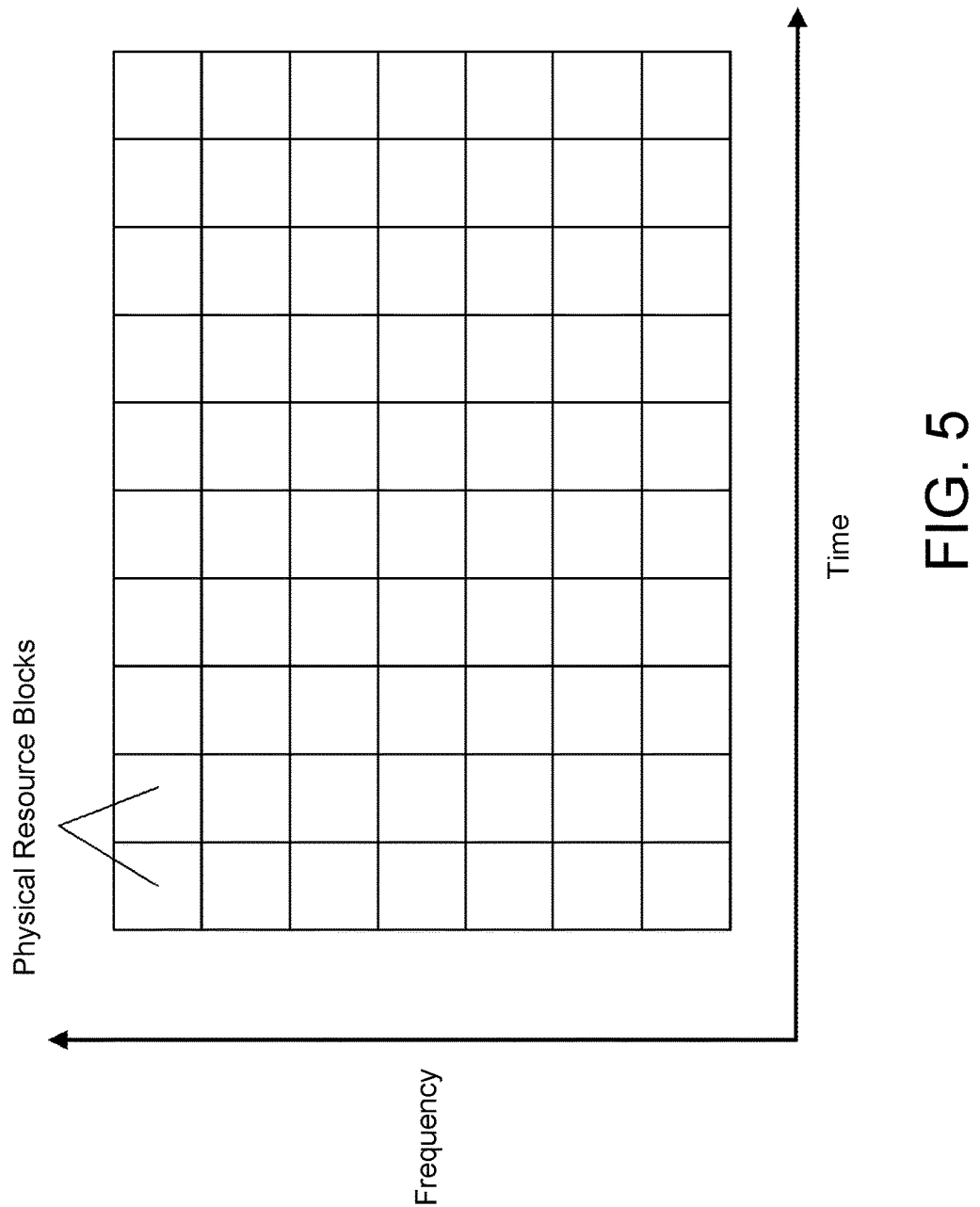
FIG. 5 illustrates exemplary physical resource blocks.

FIG. 5 illustrates a plurality of resource blocks. For example, a resource block may be identifiable based on a frequency for the resource block and time slot for the resource block. Based on a bandwidth for a frequency band, and a predetermined period of time, a plurality of available resource blocks may be determined for the frequency band. In some embodiments, the utilization may comprise the percentages of those available resource blocks used to communicate with wireless devices over the predetermined period of time. Other embodiments may implement other suitable metrics for utilization.

At step 404, weights for each of the frequency bands may be retrieved. For example, weights may be assigned to the frequency bands, for instance, based on a priority for the frequency band, conditions at access node 306 (or the cell of access node 306), and any other suitable factors. Weights for each of the first, second, and third frequency bands may be retrieved. The weights may be the same for each frequency band or different from each frequency band.

At step 404, a frame structure for one or more frequency bands may be retrieved. For example, the cell of access node 306 may communicate with wireless devices using a TDD scheme over the second frequency band. In this example, a frame structure used for communication over the second frequency band may be retrieved.

In a time division duplex (TDD) system, a frame may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency at different times. In an embodiment, a frame structure may comprise uplink subframes and/or downlink subframes, where each frame structure may comprise a different mix of subframes.

Figure 6:
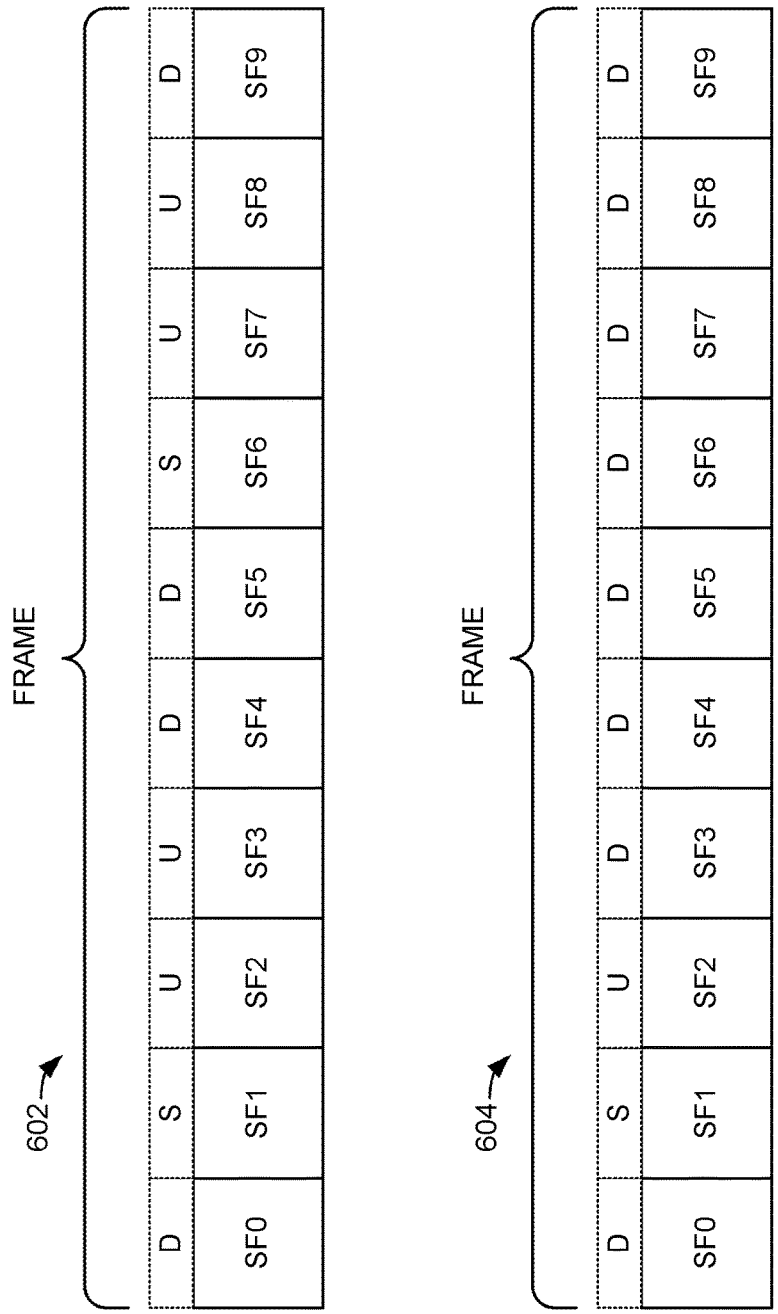
FIG. 6 illustrates exemplary subframes structures according to some embodiments.

FIG. 6 illustrates sample subframes structures in accordance with an embodiment. For example, a frame structure 602 may comprise 10 subframes, where the order of subframes may comprise downlink, special, uplink, uplink, downlink, downlink, special, uplink, uplink, and downlink. A frame structure 604 may comprise 10 subframes, where the order of subframes may comprise downlink, special, uplink, downlink, downlink, downlink, downlink, downlink, downlink, and downlink. Other frame structure may comprise various other mixes of special, downlink, and uplink configurations. In an embodiment, the cell of access node 306 may communicate with wireless devices over the second frequency band using a particular subframe configuration, and the particular subframe configuration may be retrieved.

In some embodiments, the first and third frequency bands may communicate using a TDD scheme or an FDD scheme. In an FDD scheme, uplink and downlink signals may be transmitted over a different frequency, and thus may be transmitted at the same time. In examples where the first or third frequency band communicates using a TDD scheme, a frame structure for the frequency band may also be retrieved.

At step 408, the determined loads may be adjusted based on a channel width for each frequency band and a duplexing scheme for each frequency band. For example, each of the first frequency band, the second frequency band, and the third frequency band may comprise a channel width (e.g., 3 Mhz, 5 Mhz, 10 Mhz, 15 Mhz, 20 Mhz, and the like) and a duplexing scheme (e.g., time division duplexing (TDD) or frequency division duplexing (FDD)). The determined loads for the first, second, and third frequency bands may be adjusted based on the channel width for each of the frequency bands and whether the frequency bands communicate using a TDD or FDD scheme.

In some embodiments, for a frequency band that communicates using a TDD scheme, the determined load may be adjusted based on the channel width for each of the frequency bands, the TDD scheme, and the subframe structure used to communicate with wireless devices. For example, the load adjustment may be based on one of a number of uplink subframes or a number of downlink subframes in the mix of subframes that comprise the subframe structure.

In an embodiment, the adjusted load for a frequency band may comprise $Load_{adjusted}=MIN (1, Load_{determined}*Factor_{weight})$. Here, $Load_{determined}$ may comprise the load determined (e.g., physical resource block utilization for the frequency band). For instance, $Load_{determined}$ may comprise a percentages of utilization for the frequency band (e.g., 0.10, 0.20, 0.30, 0.50. 0.75, and the like). The $Factor_{weight}$ may comprise $Factor_{weight}=1/(Factor_{BW}{}^{\wedge}((1-Load_{determined})*Weight))$. Here, $Load_{determined}$ may also comprise the load determined (e.g., physical resource block utilization for the frequency band). Weight may comprise the retrieved weight for the frequency band (e.g., at step 404). For instance, Weight may comprise the value 1, 2, 3, or any other suitable value.

In an embodiment, the $Factor_{BW}$ may comprise $Factor_{BW}=(Channel_{BW}*Ratio_{TDD})/(5*Factor_{duplex})$. Here, $Channel_{BW}$ may comprise the bandwidth for channels used by the particular frequency band to communicate with wireless devices (e.g., 3 Mhz, 5 Mhz, 10 Mhz, 15 Mhz, 20 Mhz, and the like). $Factor_{duplex}$ may comprise the value 1 for FDD schemes and the value 2 for TDD schemes.

In an embodiment, $Ratio_{TDD}$ may be a function of the duplexing scheme used and, in some cases, the subframe configuration used by the frequency band. In an FDD scheme, the $Ratio_{TDD}$ may comprise the value 1. In a TDD scheme, the $Ratio_{TDD}$ may comprise $Ratio_{TDD}=(2*Subframes_{assigned})/(Subframes^{total})$. Here, $Subframes_{assigned}$ may comprise the number of uplink subframes or downlink subframes in the implemented subframe configuration. In an embodiment, $Subframes_{assigned}$ may comprise the number of downlink subframes when the load determined (and being balanced) comprises downlink load (e.g., downlink utilization). Uplink load balancing may be similarly implemented. $Subframes_{total}$ may comprise the total number of subframes in the implemented subframe configuration (e.g., 10).

In an embodiment, the first frequency band may comprise a greater channel width (e.g., 15 Mhz) than the third frequency band (e.g., 5 Mhz). Here, adjusting the determined loads may comprise decreasing the determined load for the first frequency band while the determined load for the third frequency band is not decreased based on the channel bandwidth for the first frequency band being greater than the channel bandwidth for the third frequency band. Similarly, adjusting the determined loads may comprise increasing the determined load for the third frequency band while the determined load for the first frequency band is not increased based on the channel bandwidth for the first frequency band being greater than the channel bandwidth for the third frequency band This adjusted load may account for the available bandwidth (e.g. wireless spectrum) on each frequency band that can be used to service wireless devices. For example, the 15 Mhz channels used by the first frequency band may be able to service more wireless devices than the 5 Mhz channels used by the third frequency band when the utilizations for the frequency bands are similar (e.g., both comprise 50%). As such, a system may adjust the loads when implementing load balancing such that the first frequency band is handed over wireless devices more readily than the third frequency band since the third frequency band will become congested more quickly than the first frequency band. In other words, the determined load for the first frequency band may be decreased and the determined load for the third frequency band may be increased to configure the load balancing based on the available bandwidth on each frequency band.

In this embodiment, both the first and third frequency bands may communicate using an FDD scheme. In other embodiments, the adjusted load for a frequency band using a TDD scheme may similarly increase or decrease the determined load to account for the available bandwidth on the frequency band to service wireless devices and to encourage or discourage handovers to the frequency band (e.g., relative to other frequency bands available for load balancing).

At step 410, the adjusted loads may be balanced between the first frequency band, the second frequency band, and the third frequency band by instructing wireless devices in communication with the cell to change frequency bands used for communicating with the cell. For example, based on the adjusted loads, one or more wireless devices in communication with access node 306 using the cell may be instructed to change the frequency band used for communication. In some embodiments, the resultant handovers of wireless devices may achieve load balancing. As detailed herein, in some embodiments, use of the adjusted loads when performing load balancing may enable load to be balanced based on available bandwidth rather than utilization (e.g., physical resource block utilization).

Figure 7:
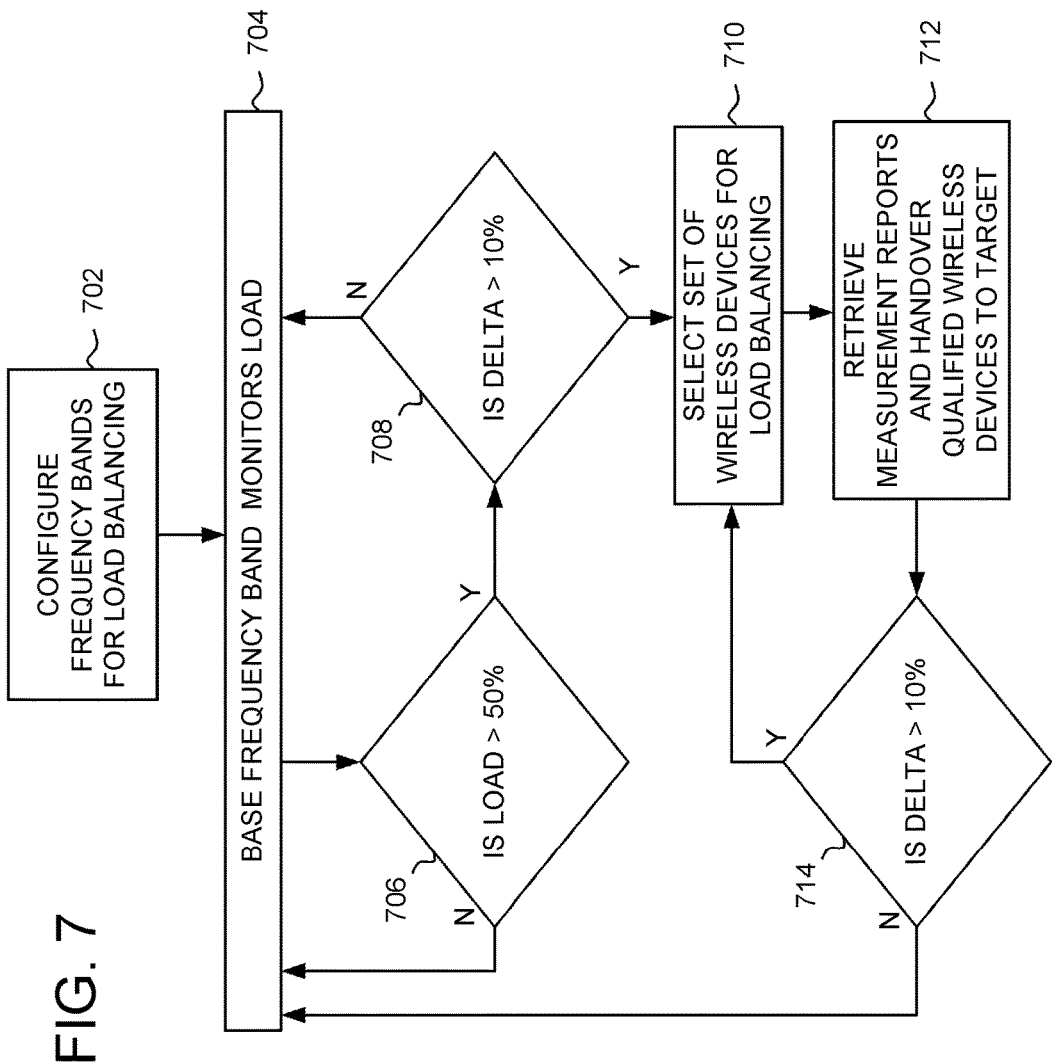
FIG. 7 illustrates an exemplary method for instructing wireless devices to perform load balancing according to some embodiments.

FIG. 7 illustrates an exemplary method for instructing wireless devices to perform load balancing according to some embodiments. For example, step 410 of FIG. 4 may comprise the method of FIG. 7. The method will be discussed with reference to the exemplary communication system 300 illustrated in FIG. 3, however, the method can be implemented with any suitable communication system.

Referring to FIG. 7, at step 702, load balancing may be configured. For example, load balancing at the cell of access node 306 may be configured. The configuration may include setting a load threshold to trigger load balancing (e.g., 50%) and a delta threshold to trigger handovers to a target frequency band (e.g., 10%). Any other suitable load thresholds or delta thresholds may be implemented.

At step 704, each frequency band may monitor its load. For example, each of the first, second, and third frequency band may monitor its load over a period of time. The monitored load may comprise the adjusted load (as detailed with reference to FIG. 4). At step 706, when the adjusted load for a particular frequency band exceeds the load threshold (e.g., 50%) the method of FIG. 7 may progress to step 708. Here, adjusted loads may be compared between frequency bands to select a target frequency band (e.g., handover target). For example, the adjusted load for the particular frequency band (for which load exceeded the load threshold) may be iteratively compared to adjusted loads for other available frequency bands available for communication at the cell of access node 306. The order of comparison (e.g., ranking for other available frequency bands) may be based on priority, descending adjusted load, or any other suitable metric. If no target frequency band is found, the method of FIG. 7 may revert to step 704, and load balancing may not be performed.

If a target frequency band is found, the method of FIG. 7 may progress to step 710, where a set of wireless devices are selected for load balancing. For example, a set of wireless devices communicating with the cell of access node 306 over the particular frequency band may be selected. The selection may be based on a channel quality indicator (CQI) for the wireless devices, a location for the wireless devices, an application requirement for the wireless devices (e.g., QCI) or any other suitable metric. At step 712, measurement reports may be retrieved for the selected wireless devices, and the wireless devices that qualify for a handover based on the retrieved measurement reports may be handed over to the target frequency band. For example, based on a received signal level over the target frequency band at each of the selected wireless devices, a portion (or all) of the selected wireless devices may qualify for a handover to the target frequency band.

At step 714, once the qualifying wireless devices have performed a handover, the delta between the adjusted loads for the particular frequency band and the target frequency band may be compared. When the delta is still greater than delta threshold (e.g., 10%), the method of FIG. 7 may progress to step 710, where wireless devices may again be selected and additional qualifying devices may be handed over to the target frequency band. When the delta is less than the delta threshold, the method of FIG. 7 may progress to step 704, where the plurality of frequency bands continue to monitor their adjusted loads for load balancing.

FIG. 8 illustrates exemplary values for adjusted loads according to some embodiments. For example, the adjusted load values may comprise the determined adjusted loads, as described herein with respect to step 408 of FIG. 4. For example, table 802 comprises exemplary adjusted load values that correspond to monitored loads (e.g., adjusted loads corresponding to 90%, 80%, 70%, and the like) for 3 Mhz channels, wherein the various columns list the adjusted load based on a first, second, and third weights. Similarly, table 804 comprises exemplary adjusted load values that correspond to monitored loads for 5 Mhz channels using various weights and table 806 comprises exemplary adjusted load values that correspond to monitored loads for 15 Mhz channels using various weights. While embodiments using an FDD scheme are illustrated, a TDD scheme may be similarly implemented.

Figure 9A:
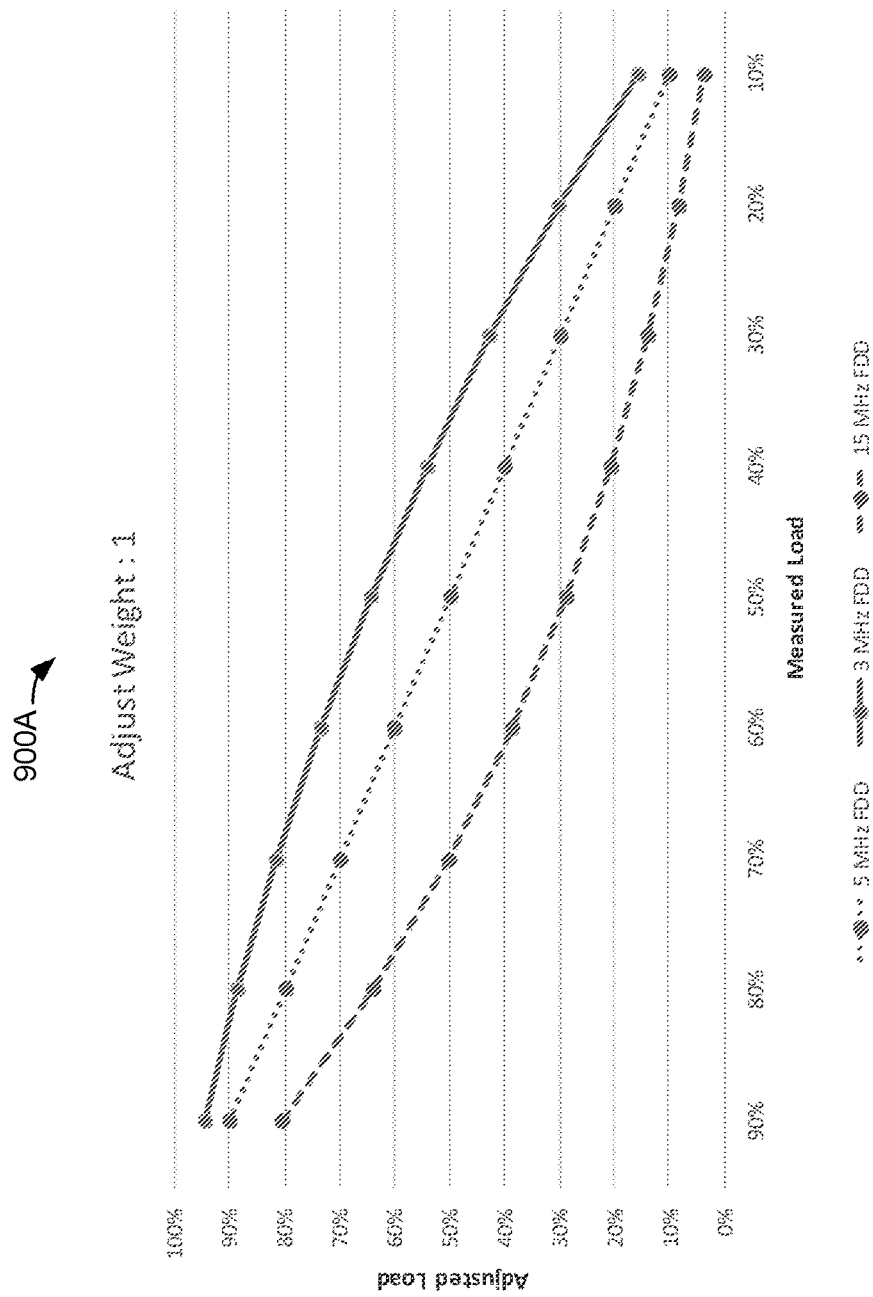
FIGS. 9A and 9B illustrate exemplary graphs of adjusted loads for frequency bands according to some embodiments.
Figure 9B:
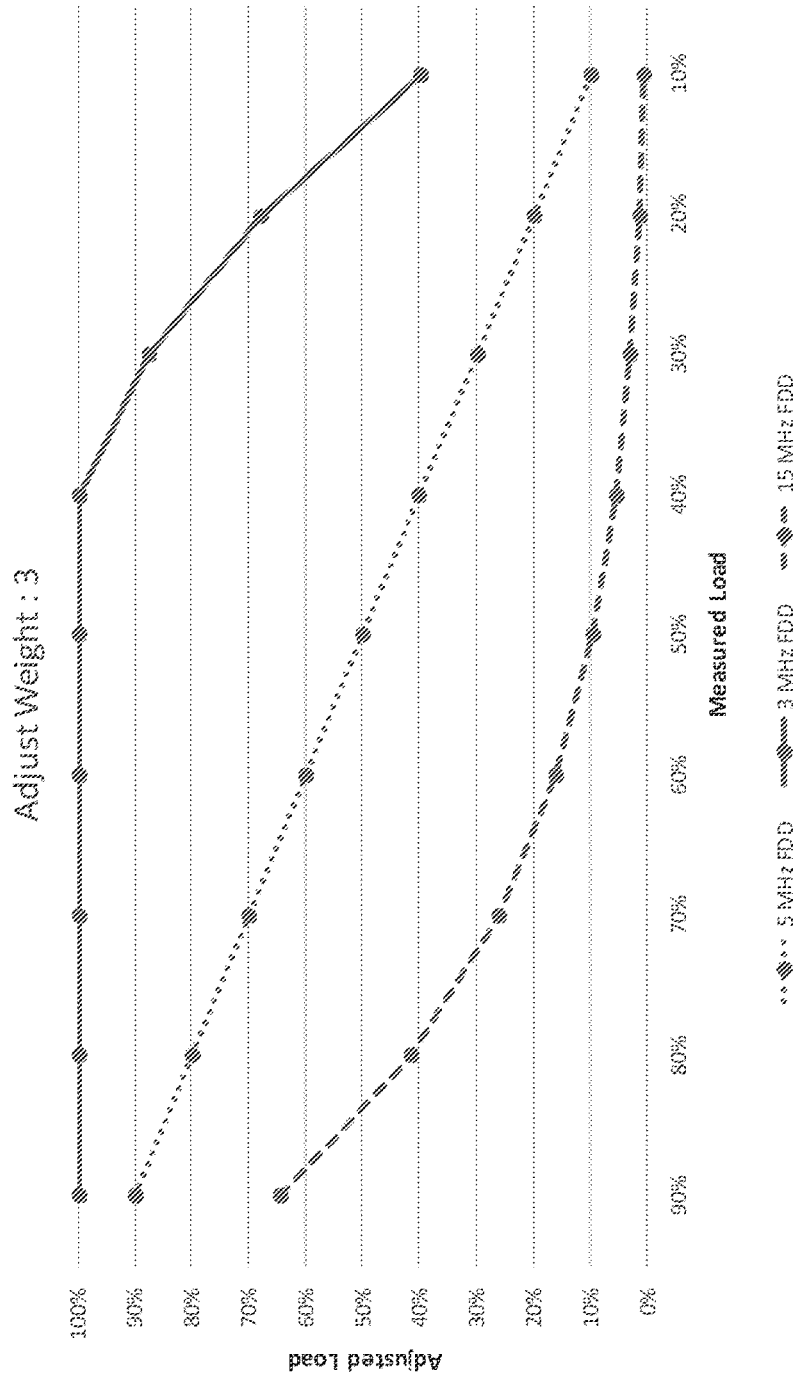

FIGS. 9A and 9B illustrate exemplary graphs that depict adjusted loads according to some embodiments. For example, the adjusted load values may comprise the values as illustrated in FIG. 8 for various system configurations. For example, graph 900A depicts adjusted loads corresponding to monitored loads for 3 Mhz, 5 Mhz, and 15 Mhz channels when a first adjustment weight is used. Similarly, graph 900B depicts adjusted loads corresponding to monitored loads for 3 Mhz, 5 Mhz, and 15 Mhz channels when a third adjustment weight is used. In an embodiment, the third adjustment weight may be greater than the first adjustment weight.

As depicted, in some embodiments, the adjustment to the monitored load may be increased or decreased based on the implemented weight. For example, the adjusted load that corresponds to a 60% monitored load on a 15 Mhz channel may comprise 39% using the first weight and 16% using the third weight. Accordingly, the reduction in the load caused by the adjustment is directly proportional to the weight increase. Similarly, the adjusted load that corresponds to a 60% monitored load on a 3 Mhz channel may comprise 74% using the first weight and 100% using the third weight. Here, the addition in the load caused by the adjustment is directly proportional to the weight increase.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 10:
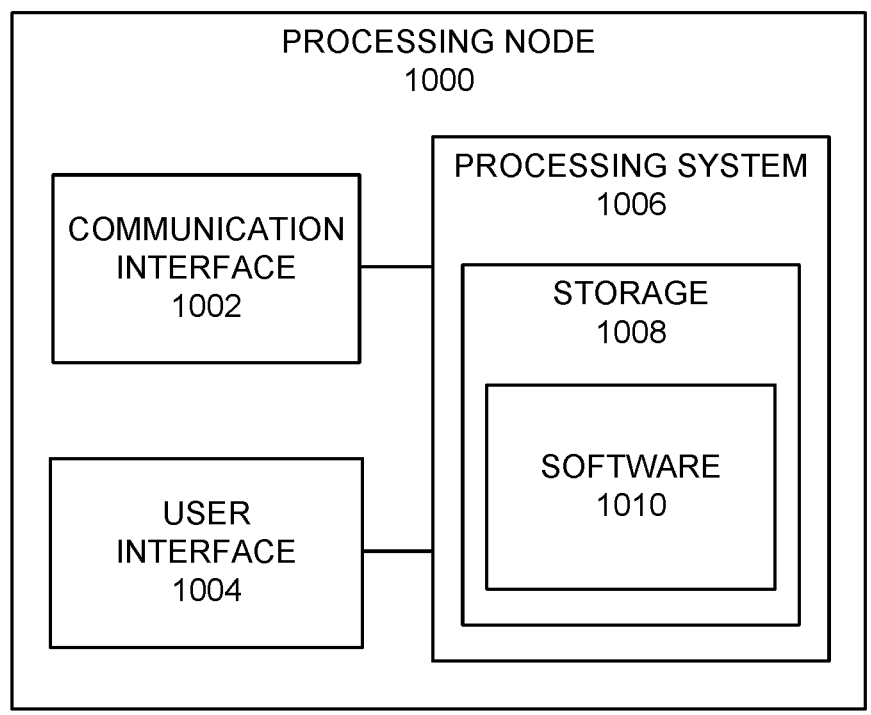
FIG. 10 illustrates an exemplary processing node.

FIG. 10 illustrates an exemplary processing node 1000 in a communication system. Processing node 1000 comprises communication interface 1002, user interface 1004, and processing system 1006 in communication with communication interface 1002 and user interface 1004. Processing node 1000 can be configured to determine a communication access node for a wireless device. Processing system 1006 includes storage 1008, which can comprise a disk drive, flash drive, memory circuitry, or other memory device. Storage 1008 can store software 1010 which is used in the operation of the processing node 1000. Storage 1008 may include a disk drive, flash drive, data storage circuitry, or some other memory apparatus. Software 1010 may include computer programs, firmware, or some other form of machine-readable instructions, including an operating system, utilities, drivers, network interfaces, applications, or some other type of software. Processing system 1006 may include a microprocessor and other circuitry to retrieve and execute software 1010 from storage 1008. Processing node 1000 may further include other components such as a power management unit, a control interface unit, etc., which are omitted for clarity. Communication interface 1002 permits processing node 1000 to communicate with other network elements. User interface 1004 permits the configuration and control of the operation of processing node 1000.

Examples of processing node 1000 include controller node 1010 and gateway node 312. Processing node 1000 can also be an adjunct or component of a network element, such as an element of access node 106, access node 306, and the like. Processing node 1000 can also be another network element in a communication system. Further, the functionality of processing node 1000 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for load balancing between frequency bands based on bandwidth capacity in a cell of a cellular network, the cell comprising an access node configured to transmit at first and second frequency bands to a plurality of wireless devices, the method comprising:
    determining a load for the first frequency band and a load for the second frequency band, wherein the cell communicates with the plurality of wireless devices over the first and second frequency bands;
    adjusting the determined loads for the first frequency band and the second frequency band based on both a channel width for each frequency band and a duplexing scheme for each frequency band, wherein the channel width for the first frequency band is greater than the channel width for the second frequency band, wherein the determined load for the second frequency band is further adjusted based on one of a number of uplink subframes or a number of downlink subframes for a subframe structure used to communicate with the cell over the second frequency band; and
    balancing the adjusted loads between the first frequency band and the second frequency band by instructing the plurality of wireless devices in communication with the cell to change frequency bands used for communicating with the cell.

2. The method of claim 1, wherein adjusting the determined loads is further based on a weight for each frequency band.

3. The method of claim 1, wherein the duplexing scheme for the first frequency band comprises a time division duplexing and the duplexing scheme for the second frequency band comprises frequency division duplexing.

4. The method of claim 1, wherein the determined load for the first and second frequency bands comprises a percentage utilization of physical resource blocks over each frequency band.

5. The method of claim 1, further comprising:
    determining a load for a third frequency band, wherein the cell communicates with the plurality of wireless devices over the third frequency band;
    adjusting the determined load for the third frequency band based on a channel width for the third frequency band and a duplexing scheme for the third frequency band; and
    balancing the adjusted loads between the first frequency band, the second frequency band, and the third frequency band by instructing the plurality of wireless devices in communication with the cell to change frequency bands used for communicating with the cell.

6. A cellular network system for load balancing between frequency bands based on bandwidth capacity, the cellular network system comprising:
    a plurality of wireless devices;
    a cell comprising an access node configured to transmit at first and second frequency bands to the plurality of wireless devices, the access node comprising a processor configured to:
    determine a load the first frequency band and a load for the second frequency band, wherein the cell of the access node communicates with the plurality of wireless devices over the first and second frequency bands;
    adjust the determined loads for the first frequency band and the second frequency band based on both a channel width for each frequency band and a duplexing scheme for each frequency band, wherein the channel width for the first frequency band is greater than the channel width for the second frequency band, wherein the determined load for the second frequency band is further adjusted based on one of a number of uplink subframes or a number of downlink subframes for a subframe structure used to communicate with the cell over the second frequency band; and
    balance the adjusted loads between the first frequency band and the second frequency band by instructing the plurality of wireless devices in communication with the cell to change frequency bands used for communicating with the cell.

7. The cellular network system of claim 6, wherein adjusting the determined loads is further based on a weight for each frequency band.

8. The cellular network system of claim 6, wherein the duplexing scheme for the first frequency band comprises a time division duplexing and the duplexing scheme for the second frequency band comprises frequency division duplexing.

9. The cellular network system of claim 6, wherein the determined load for the first and second frequency bands comprises a percentage utilization of physical resource blocks over each frequency band.

10. The cellular network system of claim 6, wherein the access node is further configured to:
    determine a load for a third frequency band, wherein the cell communicates with the plurality of wireless devices over the third frequency band;
    adjust the determined load for the third frequency band based on a channel width for the third frequency band and a duplexing scheme for the third frequency band; and
    balance the adjusted loads between the first frequency band, the second frequency band, and the third frequency band by instructing the plurality of wireless devices in communication with the cell to change frequency bands used for communicating with the cell.

* * * * *